US012168245B2

(12) United States Patent
Shaw

(10) Patent No.: US 12,168,245 B2
(45) Date of Patent: *Dec. 17, 2024

(54) METHOD AND APPARATUS FOR SEPARATING AGGREGATE FOR A CONCRETE TOPPING SLAB

(71) Applicant: Shaw & Sons, Inc., Costa Mesa, CA (US)

(72) Inventor: Ronald D. Shaw, Costa Mesa, CA (US)

(73) Assignee: Shaw & Sons, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,559

(22) Filed: Oct. 24, 2023

(65) Prior Publication Data

US 2024/0058842 A1 Feb. 22, 2024

Related U.S. Application Data

(63) Continuation of application No. 18/063,520, filed on Dec. 8, 2022, now Pat. No. 11,826,783, which is a (Continued)

(51) Int. Cl.
*B07B 1/34* (2006.01)

(52) U.S. Cl.
CPC .................................... *B07B 1/343* (2013.01)

(58) Field of Classification Search
CPC .... B07B 1/40; B07B 1/30; B07B 1/34; B07B 1/343; B07B 1/42; B07B 1/4609; B07B 13/16; B07B 1/46
See application file for complete search history.

(56) References Cited

U.S. PATENT DOCUMENTS 348,443 A 8/1886 Debs
399,486 A * 3/1889 Bradshaw et al. ........ B07B 1/30 209/345

(Continued)

FOREIGN PATENT DOCUMENTS

WO 8501690 A1 4/1985
WO WO-2024031111 A1 * 2/2024 ............... B07B 1/04

OTHER PUBLICATIONS

Journal of the American Concrete Institute, "Cement-Aggregate Reaction in Concrete", Oct. 1947, vol. 19, No. 2, 36 pgs.

(Continued)

*Primary Examiner* — Patrick H Mackey
(74) *Attorney, Agent, or Firm* — Stetina Brunda Garred & Brucker

(57) ABSTRACT

A base supports an inclined screen having a uniform mesh selected to remove larger aggregate from a first cement mixture to form a second cement mixture that passes through the screen. A powered vibrator vibrates the screen to separate the concrete mixtures and larger aggregate. Springs and/or dampers in support legs isolate the vibrating screen from the base. A guide frame on the top surface of the screen guides the first concrete mixture along the screen and guide the separated aggregate out a bottom opening into an aggregate container. A support frame on the bottom surface of the screen stiffens the screen to help support the weight of the concrete. A concrete container, preferably wheeled, is below the screen to collect the second concrete mixture and move it to its use location.

11 Claims, 5 Drawing Sheets

Related U.S. Application Data continuation of application No. 16/885,051, filed on May 27, 2020, now Pat. No. 11,534,798.

(56) References Cited

U.S. PATENT DOCUMENTS

| | | | | |
|---|---|---|---|---|
| 712,168 | A | 10/1902 | Worth | |
| 738,704 | A | 9/1903 | Semmer | |
| 745,068 | A | 11/1903 | Menczarski | |
| 763,064 | A | 6/1904 | Mercer | |
| 821,277 | A | 5/1906 | Bellars | |
| 828,031 | A | 8/1906 | Kemper | |
| 830,747 | A | 9/1906 | Stauffer | |
| 836,369 | A | 11/1906 | Dexter | |
| 958,194 | A | 5/1910 | Thomas | |
| 967,836 | A | 8/1910 | Rodham | |
| 969,435 | A | 9/1910 | Adamson | |
| 1,359,893 | A | 11/1920 | Hopkins | |
| 1,397,678 | A | 11/1921 | De Paoli | |
| 1,534,353 | A | 4/1925 | Besser | |
| 1,728,936 | A | 9/1929 | Johnson | |
| 1,735,067 | A * | 11/1929 | Stevenson | B07B 1/00 209/415 |
| 1,769,990 | A | 7/1930 | Fischer | |
| 1,891,530 | A | 12/1932 | Galassi | |
| 1,958,391 | A | 5/1934 | Hall et al. | |
| 1,997,216 | A | 4/1935 | Heltzel | |
| 2,101,540 | A | 12/1937 | Gullich | |
| 2,172,629 | A | 9/1939 | Treuhaft | |
| 2,200,433 | A | 5/1940 | Ripley | |
| 2,275,272 | A | 3/1942 | Scripture, Jr. | |
| 2,277,203 | A | 3/1942 | Boult | |
| 2,296,453 | A | 9/1942 | Saffert | |
| 2,476,465 | A | 7/1949 | Tarrant | |
| 2,493,826 | A | 1/1950 | Oelfke et al. | |
| 2,746,465 | A | 5/1956 | Farison | |
| 2,907,129 | A | 10/1959 | Bedell | |
| 2,925,831 | A | 2/1960 | Welty et al. | |
| 2,931,751 | A | 4/1960 | Du Fresne | |
| 2,949,828 | A | 8/1960 | Carnes | |
| 3,157,097 | A | 11/1964 | Stinnett, Jr. et al. | |
| 3,161,442 | A | 12/1964 | Reed | |
| 3,319,392 | A | 5/1967 | Fitzgerald | |
| 3,334,555 | A | 8/1967 | Nagin et al. | |
| 3,368,464 | A | 2/1968 | Thorp, Jr. et al. | |
| 3,441,457 | A | 4/1969 | Regnaud | |
| 3,646,715 | A | 3/1972 | Pope | |
| 3,797,867 | A | 3/1974 | Hartl | |
| 3,815,824 | A | 6/1974 | Olson | |
| 3,816,155 | A | 6/1974 | Iverson et al. | |
| 3,838,930 | A | 10/1974 | Koch | |
| 3,874,140 | A | 4/1975 | Seehusen | |
| 3,967,911 | A | 7/1976 | Miers | |
| 4,008,974 | A | 2/1977 | Miers | |
| 4,070,849 | A | 1/1978 | Digiacomo | |
| 4,076,875 | A | 2/1978 | Van Gasse | |
| 4,115,976 | A | 9/1978 | Rohrer | |
| 4,128,358 | A | 12/1978 | Compton | |
| 4,146,599 | A | 3/1979 | Lanzetta | |
| 4,190,997 | A | 3/1980 | Holt | |
| 4,198,176 | A | 4/1980 | Bentz | |
| 4,205,040 | A | 5/1980 | Aoyama et al. | |
| 4,270,789 | A | 6/1981 | Cline | |
| 4,281,496 | A | 8/1981 | Danielsson | |
| 4,388,016 | A | 6/1983 | Levey | |
| 4,443,496 | A | 4/1984 | Obitsu et al. | |
| 4,496,504 | A | 1/1985 | Steenson et al. | |
| 4,542,040 | A | 9/1985 | Nowak | |
| 4,646,482 | A | 3/1987 | Chitjian | |
| 4,662,972 | A | 5/1987 | Thompson | |
| 4,697,951 | A | 10/1987 | Allen | |
| 4,714,507 | A | 12/1987 | Ohgushi | |
| 4,748,788 | A | 6/1988 | Shaw et al. | |
| 4,769,201 | A | 9/1988 | Chiuminatta et al. | |
| 4,889,455 | A | 12/1989 | Karlsson et al. | |
| 4,915,888 | A | 4/1990 | Sato | |
| 4,947,600 | A | 8/1990 | Porter | |
| 5,010,982 | A | 4/1991 | Sedlmayr | |
| 5,024,029 | A | 6/1991 | Abbott et al. | |
| 5,042,211 | A | 8/1991 | Nestler | |
| 5,092,091 | A | 3/1992 | Hull et al. | |
| 5,114,475 | A | 5/1992 | Siegmund et al. | |
| 5,125,953 | A | 6/1992 | Gattner et al. | |
| 5,226,279 | A | 7/1993 | Rendon-Herrero | |
| 5,234,128 | A | 8/1993 | Hill | |
| 5,246,650 | A | 9/1993 | Clark | |
| 5,395,673 | A | 3/1995 | Hunt | |
| 5,441,677 | A | 8/1995 | Phillips, Sr. | |
| 5,450,699 | A | 9/1995 | Lee | |
| 5,494,729 | A | 2/1996 | Henry et al. | |
| 5,524,769 | A | 6/1996 | Spencer | |
| 5,645,664 | A | 7/1997 | Clyne | |
| 5,673,489 | A | 10/1997 | Robell | |
| 5,755,068 | A | 5/1998 | Ormiston | |
| 5,794,401 | A | 8/1998 | Shaw et al. | |
| 5,795,108 | A | 8/1998 | Lightle | |
| 5,887,399 | A | 3/1999 | Shaw et al. | |
| 5,888,017 | A | 3/1999 | Corrie | |
| 5,910,087 | A | 6/1999 | Carter | |
| 5,950,394 | A | 9/1999 | Shaw et al. | |
| 5,956,912 | A | 9/1999 | Carter et al. | |
| 5,975,985 | A | 11/1999 | Sutherland et al. | |
| 6,016,635 | A | 1/2000 | Shaw et al. | |
| 6,033,146 | A | 3/2000 | Shaw et al. | |
| 6,082,074 | A | 7/2000 | Shaw et al. | |
| 6,092,960 | A | 7/2000 | Mccallion | |
| 6,112,487 | A | 9/2000 | Shaw et al. | |
| 6,164,037 | A | 12/2000 | Passeno | |
| 6,171,016 | B1 | 1/2001 | Pauls et al. | |
| 6,238,277 | B1 | 5/2001 | Duncan et al. | |
| 6,330,774 | B1 | 12/2001 | Weinstein | |
| 6,385,940 | B1 | 5/2002 | Maier et al. | |
| 6,444,077 | B1 | 9/2002 | Fennessy | |
| 6,568,146 | B2 | 5/2003 | Harvey | |
| 6,610,224 | B2 | 8/2003 | Sullivan | |
| 6,739,805 | B2 | 5/2004 | Shotton | |
| 6,779,945 | B2 | 8/2004 | Saffo | |
| 6,780,369 | B1 | 8/2004 | Darrow et al. | |
| 6,785,992 | B2 | 9/2004 | Chiarucci | |
| 6,834,438 | B1 | 12/2004 | Heister | |
| 6,955,834 | B2 | 10/2005 | Rohrbaugh et al. | |
| 7,051,483 | B2 | 5/2006 | Bamford | |
| 7,066,680 | B2 | 6/2006 | Wiley | |
| 7,242,799 | B1 | 7/2007 | Bremsteller | |
| 7,322,772 | B2 | 1/2008 | Shaw et al. | |
| 7,334,962 | B1 | 2/2008 | Shaw et al. | |
| 7,493,732 | B2 | 2/2009 | Brailsford et al. | |
| 7,506,672 | B2 | 3/2009 | Manno | |
| 7,591,967 | B2 | 9/2009 | Palermo et al. | |
| 7,607,859 | B2 | 10/2009 | Shaw et al. | |
| 7,614,820 | B2 | 11/2009 | Shaw et al. | |
| 7,670,081 | B2 | 3/2010 | Shaw et al. | |
| 7,781,019 | B2 | 8/2010 | Shaw et al. | |
| 8,079,775 | B2 | 12/2011 | Shaw et al. | |
| 8,141,714 | B2 * | 3/2012 | Burkhard | B07B 1/40 209/368 |
| 8,936,411 | B1 | 1/2015 | Shaw | |
| 8,962,087 | B2 | 2/2015 | Shaw et al. | |
| 8,962,088 | B2 | 2/2015 | Shaw | |
| 9,102,572 | B2 | 8/2015 | Shaw et al. | |
| 9,579,764 | B1 | 2/2017 | Wetherell et al. | |
| 9,580,915 | B2 | 2/2017 | Shaw | |
| 9,695,602 | B2 | 7/2017 | Shaw | |
| 9,790,693 | B2 | 10/2017 | Wilde | |
| 10,648,183 | B2 | 5/2020 | Shaw | |
| 10,730,055 | B2 | 8/2020 | Furrer et al. | |
| 11,534,798 | B2 * | 12/2022 | Shaw | B07B 1/40 |
| 11,826,783 | B2 * | 11/2023 | Shaw | B07B 1/4609 |
| 2003/0007836 | A1 | 1/2003 | Clarke et al. | |
| 2003/0061722 | A1 | 4/2003 | Bradley | |
| 2003/0140594 | A1 | 7/2003 | Shaw et al. | |
| 2003/0164753 | A1 | 9/2003 | Gongolas | |
| 2003/0227814 | A1 | 12/2003 | Priesnitz et al. | |
| 2004/0041295 | A1 | 3/2004 | Shaw et al. | |
| 2004/0118025 | A1 | 6/2004 | Shalit | |

(56) References Cited

U.S. PATENT DOCUMENTS

| | | | |
|---|---|---|---|
| 2004/0197548 | A1 | 10/2004 | Kopystecki |
| 2005/0140038 | A1 | 6/2005 | Frienser |
| 2005/0238429 | A1 | 10/2005 | Kipp |
| 2006/0083591 | A1 | 4/2006 | Shaw et al. |
| 2007/0187873 | A1 | 8/2007 | Bailey |
| 2012/0317912 | A1 | 12/2012 | Shaw |
| 2013/0125504 | A1 | 5/2013 | Brailsford et al. |
| 2014/0000214 | A1 | 1/2014 | Vasquez, Jr. et al. |
| 2017/0275893 | A1 | 9/2017 | Shaw |
| 2017/0298626 | A1 | 10/2017 | Shaw |
| 2017/0334032 | A1 | 11/2017 | Yagur et al. |
| 2021/0000210 | A1 | 1/2021 | Lowe |

OTHER PUBLICATIONS

Concrete Information, "Finishing Concrete Slabs, Exposed Aggregate, Patterns and Colors", 9 pgs.[1979].
Reed Publishing USA, "Speciality Concretes", Jun. 28, 1984, 6 pgs.
L.M. Schofiled Company, "Lithotex Top Surface Retarder", 1985, 1 pg.
Concrete Products, "Integral Color in Concrete", Apr. 1988, 5 pgs.
Ardex, Inc., "Self-Leveling Toppings and Underlayments", 4 pgs. (1992).
Concrete Construction, "Practical, Precise, and Profitable Concrete Production Systems", Aug. 1993, 1 pg.
Mayco Pump Corp., "ST-60 the ST Series of Mid Range Concrete Pumps", 4 pgs. [1993].
Quick Mix, "No One Beats the Price of the Quick Mix!", 1 pg. [1993].
Schwing America Inc., "Truck or Trailer Mounted Concrete Pump", 4 pgs. (1993).
Sinak Corporation, Product Information Sheet Sinak Sealers HLQ-125, HLQ-250 General Applications; 2 pgs. [1995].
www.cement.org, "Placing & Finishing Concrete", 4 pgs. (Dec. 13, 2003).
PNA Constructions Technologies; "PNA Square Dowel Basket Isometric"; 2 pgs. (Jun. 2004).
Sandell Manufacturing Co., Inc.; "Sandell's Zip Strip & Expansion Joint"; 2 pgs. (Oct. 2007).
Family Handyman, "Howto Finish Concrete", Jul. 8, 2013 [http://www.familyhandyman.com/masonry/pouring-concrete/how-to-finish-concrete/view-all/].

* cited by examiner

METHOD AND APPARATUS FOR SEPARATING AGGREGATE FOR A CONCRETE TOPPING SLAB

CROSS-REFERENCE TO RELATED APPLICATIONS

The present application is a continuation of U.S. patent application Ser. No. 18/063,520, filed Dec. 8, 2022, which is a continuation of U.S. patent application Ser. No. 16/885,051, filed May 27, 2020, now U.S. Pat. No. 11,534,798, issued Dec. 27, 2022, the entire disclosure of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to the art of concrete construction, and more particularly, to a method and apparatus for separating aggregate of a predetermined size range from a concrete mixture for use as a concrete topping slab having a substantially smooth and uniform outer surface texture.

2. Related Art

A concrete cast in place wall is typically constructed on-site rather than being manufactured at an off-site facility and subsequently transported to the construction site. The fabrication of a cast in place concrete wall typically begins with the construction of a concrete wall form, with non-hydrated or wet, flowable concrete poured into the wall form and given time to cure or hydrate. Once the concrete has sufficiently hardened, the corresponding wall form is removed from the fully formed concrete structure.

One of the deficiencies associated with the currently known cast in place wall construction is that the resultant wall or other structure tends to have a roughened surface texture upon the removal of the form. For example, there tend to be slight inconsistencies in the overall finish of the wall or other structure, such inconsistencies being caused by any one of a number of different factors, including inconsistencies in the form work, sandblasting of the surface, finishing, concrete and/or the placing or pumping of the concrete into the form, and differences in the concrete color or texture across different portions of the concrete surface. These differences in texture include small holes or other indentations are often found throughout the exposed surfaces of the wall or other structure, such holes or other indentations being formed as a result of the entrapment of air during the forming process. These holes or other indentations are undesirable, in as much as they diminish the aesthetic appeal of the wall or other structure. There is thus a need for a method and apparatus to provide a surface of a desired texture and color on such cast-in-place walls.

Concrete walls, ceilings, and other concrete surfaces may also be formed using shotcrete, also known as sprayed concrete or gunite. Shotcrete, which can refer to both the material and the construction technique itself, involves pneumatically projecting concrete or mortar at high velocity onto a surface, typically a surface that has been prepared in advanced by the placement of reinforcing material such as steel rods, steel mesh, or fibers, such that the sprayed shotcrete will encase the reinforcing material. But the shotcrete wall has a rough finish and if troweled has the same size of aggregate throughout the wall, which aggregate may be apparent at the surface of the wall when finished or when the wall is chipped. Larger aggregate at the exterior surface is believed undesirable, so there is a need for a slab layer of finishing material on the outer surface of the wall.

U.S. Pat. No. 9,102,572 applies a surface coating to a roughened concrete wall. The concrete is poured from a first mixture and is allowed to set up, i.e., harden. After the concrete has hardened, the wall form is removed from the resultant concrete base structure. A roughened texture is then created on the base concrete structure. A finishing mixture is then applied to the roughened texture. The finishing mixture is created by separating a larger sized aggregate from a portion of the remaining first mixture. The finishing mixture creates a smooth texture on the exterior surfaces of the initially formed base structure and starting with the same concrete mixture for the finishing mixture helps ensure that the same color of concrete can be used as the underlying concrete wall. A small screening box may be used with a worker shoveling in wet concrete and using squeegee to force the sand and cement through a screen. But the volume of the finished mixture is limited and time consuming to produce. Also, because the concrete continues to hydrate and harden during the process the time to apply the finishing mixture to the wall can become limited. To increase the volume of the finishing mixture and shorten the time to create that volume a larger screening box may be held over a container such as a wheelbarrow and manually held and shaken by two workers to separate the aggregate from the sand and cement in the concrete mixture, while a third worker continually shovels the concrete mixture into the screening box. But this approach is very labor intensive, is expensive and time consuming, and still limits the amount of finishing mixture. There is thus a need for an improved method and apparatus for creating a finishing mixture for the surfaces on concrete walls.

Aggregates may comprise 60 to 75% of the total volume of concrete, and are divided into two categories—fine and coarse. In addition to limiting the type of aggregate used in concrete mixtures, the concrete specifications typically require predetermined grades of aggregate. The different grades limit the maximum aggregate size because that size affect the amount of aggregate used as well as affecting the amount of cement and water used, the workability, pumpability and durability. A smaller aggregate size usually results in stronger and more durable concrete, but also requires more cement which is expensive, and results in using less aggregate which is less expensive than the cement. For example, coarse aggregates are particles greater than 0.19 inches, but usually range between 3/8 and 1.5 inches in size, and typically include gravel or crushed stone, with elongated particles being avoided. Coarse aggregates vary in size ranges from fine gravel (4 mm-8 mm), to medium gravel, to coarse gravel, to cobbles to boulders (over 256 mm). Fine aggregates include various types of sand sized by various sieves with square grids of varying sizes to grade the sand. By separating the aggregates from a concrete mixture, the separation process must separate the aggregates from a thickened slurry of water, cement, smaller aggregates and other materials which may stick to the separating screen, slowing separation. There is thus a need for a method and apparatus to more efficiently and quickly separate the aggregate and form the finishing mixture.

BRIEF SUMMARY

To address these and other problems and to provide various advantages, an apparatus is provided having a base supporting an inclined screen that has a uniform mesh selected to remove larger aggregate from a first cement mixture to form a second cement mixture that passes through the screen. A powered vibrator vibrates the screen to separate the two concrete mixtures and larger aggregate. Springs and/or dampers in support legs connect the screen to the base and isolate the vibrating screen from the base. A guide frame on the top surface of the screen guides the first concrete mixture along the screen while the second concrete mixture falls through the screen and into a container that is preferably wheeled. The guide frame also guides the separated aggregate out a bottom opening into an aggregate container. A support frame on the bottom surface of the screen stiffens the screen to help support the weight of the concrete during use, with the support frame advantageously being bolted to the guide frame. The wheeled concrete container (e.g., a wheel borrow) may be placed below the screen to collect the second concrete mixture and move it to its use location, such as applying a finish coating to a concrete wall that was formed earlier using the first concrete mixture from which the larger aggregate is separated to form the second concrete mixture. This apparatus allows use of an improved method for applying the second concrete mixture, which method is described below.

In more detail, there is advantageously provided an apparatus for preparing a finishing mixture from a first concrete mixture for use on a concrete surface, the first concrete mixture having aggregate. The apparatus includes an inclined guide frame that is preferably rectangular and connected to a periphery of a wire mesh screen having a plurality of uniformly-sized screen openings, which can vary in size, but preferably are from 0.19 to 0.5 inches square. The guide frame may have opposing top and bottom frame ends connected by opposing first and second frame sides, with each frame side and the top frame end having an inward extending leg on a top surface of the screen. The guide frame is connected to the screen at a periphery of the screen and has an upward extending leg extending above the screen along the periphery of the screen. The bottom frame end has a central frame opening through which the larger, separated aggregate may pass out of the guide frame and off the screen. First and second funnel members on the top surface of the screen each have a top funnel end at respective ones of the first and second guide frame sides and have a bottom funnel end at adjacent end of central frame opening to guide aggregate to that central frame opening. Each guide member advantageously extends above the top of the screen a distance of at least one inch and preferably one to four inches to keep larger aggregate from bouncing over the guide member as the screen vibrates.

A powered vibrating unit is connected to the frame to vibrate the frame up and down to facilitate separating the large aggregate from the first concrete mixture. Two bottom support legs connect to either of the bottom end frame or a bottom portion of different ones of the first and second side frames. Two top support legs connect to either the top end frame or a top portion of different ones of the first and second side frames. The top support legs are longer than the bottom support legs to incline the screen and frame at an angle preferably between 10 and 45° from the horizontal, so that the top end frame is higher than the bottom end frame when a distal end of each leg rests on a horizontal support surface.

When the first concrete mixture is placed on the vibrating screen, aggregate larger than the openings in the screen move toward the central frame opening while the remainder of the first concrete mixture passes through the screen to form the second concrete mixture, which in turn falls into a concrete container.

In further variations, the apparatus advantageously includes a damper, a spring or both, in each leg. The damper and/or spring are located closer to the screen than the distal end of the respective legs and are oriented to reduce vibration along a length of the respective leg. Advantageously, at least two legs each include a spring, and the spring is preferably a coil spring.

In further variations of the apparatus, a support frame is located on the opposing surface of the screen as the guide frame. The support frame may be connected to at least one of the screen or guide frame around the periphery of the screen and overlapping in a vertical direction a major portion of the guide frame. Still further variations include having the support frame overlap (in a vertical direction) a major portion of the guide frame. The support frame and guide frame are advantageously connected by releasable fasteners such as bolts. The first and second side frames advantageously have an L-shaped cross-section with one leg perpendicular to the screen and with those perpendicular legs spaced 2 to 5 feet apart. The screen advantageously comprises a woven wire screen having openings sized as desired for a particular project. The angle of inclination of the screen is typically between 20° and 45° from the horizontal.

There is also provided a method of forming a second concrete mixture from a first concrete mixture. The method includes providing a first mixture of non-hydrated, flowable concrete comprising a cement, aggregate larger than 0.2 inches, and water. The first concrete mixture is placed onto an inclined screen having uniformly sized screen openings between 0.2 and 0.4 inches square. The screen has opposing first and second screen sides and opposing top and bottom screen ends extending between the screen sides, with the top screen end higher than the bottom screen end. The screen also has opposing top and bottom screen surfaces. The method includes guiding a portion of the first concrete mixture and aggregate that does not pass through the screen openings along a length of the screen and toward a bottom frame opening at the bottom of the screen, while vibrating the inclined screen using a powered vibrator so non-hydrated concrete passes through the screen openings to form a second concrete mixture from which aggregate larger than the screen openings is removed. At least some of the removed aggregate moves down the vibrating screen and through the bottom frame opening.

In further variations, the second concrete mixture passes into a manually movable container, preferably a container with at least one wheel. The method may also include moving the container to a concrete wall and applying the second concrete mixture to an outer surface of that wall. The method preferably includes locating the concrete beneath the vibrating screen. The concrete container may include a wheel borrow located beneath the vibrating screen.

In further variations, the moving step comprises shoveling the first concrete mixture onto the vibrating screen, or locating a discharge end of a chute on a concrete truck over the vibrating screen so the discharged first concrete mixture falls onto the screen or locating a discharge end of a boom pump over the vibrating screen and pumping the first concrete mixture so it flows onto the screen.

In still further variations, the method includes the step of attenuating the amplitude of vertical vibration between the screen and a support base by using springs, dampers or both—interposed between the screen and the support base. Advantageously, the attenuating step locates a spring, damper or both in a plurality of legs supporting the vibrating screen on a support surface such as the ground.

In further variations, the guiding step may include a guide frame extending around a major portion of the periphery of the screen with the guide frame extending above the top surface of the screen a distance sufficient to restrain flow of the first concrete mixture past the guide frame and configured to guide the first concrete mixture toward the bottom frame opening. A distance of one to four inches is believed sufficient to restrain the flow and guide the larger aggregate toward the bottom frame opening. The guiding step may include a support frame extending a major portion of the periphery of the screen and located on the bottom surface of the screen opposite the guide frame, with the screen sandwiched between the guide frame and the support frame. The guide frame and support frame may be releasably connected by threaded fasteners.

BRIEF DESCRIPTION OF THE DRAWINGS

These and other features and advantages of the various embodiments disclosed herein are better understood with respect to the following descriptions and drawings, in which common reference numerals are used throughout the drawings and the detailed description to indicate the same elements, and in which.

DETAILED DESCRIPTION

Figure 1:
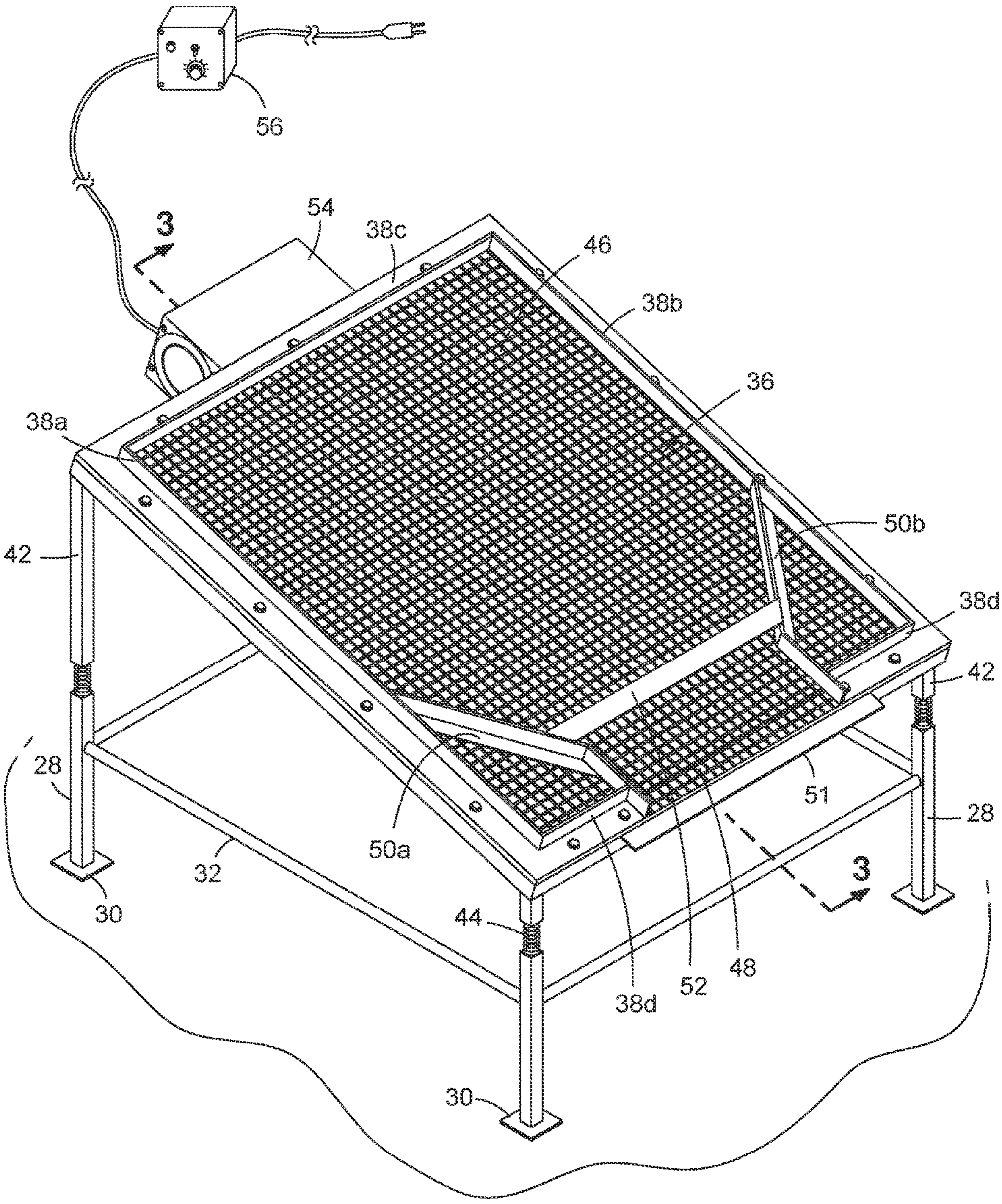
FIG. 1 is a perspective view of a vibrating screen assembly of this invention.

Common reference numerals are used throughout the drawings and the detailed description to indicate the same elements, and in which: 10—1st concrete mixture; 12—screen assembly; 14—large aggregate; 16-2nd concrete mixture; 18—wall; 20—finish coat; 22—aggregate container; 24—base; 28—base legs; 30—feet; 32—braces; 36—screen; 38*a, b, c, d*—left, right, top, bottom sides of guide frame; 40*a, b, c, d*—left, right, top, bottom sides of support frame; 42—screen assembly legs; 44—connector; 46—screen openings; 48—opening formed by funnel members; 50*a, b*—funnel members; 51—dispensing plate; 52—brace; 54—vibrator; 56—vibrator control; and 70—concrete container.

As used herein, the relative directions up and down, top and bottom, upper and lower, above and below are with respect to the vertical axis relative to a horizontal ground surface. The lateral direction is perpendicular to the vertical axis. The inward direction is toward a longitudinal axis extending from the top to the bottom of the screen assembly and through a middle of the screen of that assembly. The outward direction is away from that axis or away from the screen assembly. As used herein, As used herein, the term “about” encompasses a 10% variation, the term “majority” means more than half, and a “substantial majority” or “substantial portion” means 90% or more.

Referring to FIGS. 1-8, a first mixture of un-hydrated concrete 10 contains cement, aggregate and water, but may contain additional additives including retardant, color, decorative items and/or other materials. The first concrete mixture 10 is typically mixed manually in a stationary container, or mixed in a rotating container in small batch concrete mixers, or in a rotating container mounted to a concrete truck. The first concrete mixture 10 is moved to a screen assembly 12 which separates out large aggregate 14 of a predetermined minimum size from the first concrete mixture 10, to form a second, non-hydrated concrete mixture 16 containing only aggregate smaller than the removed large aggregate 14. The second concrete mixture 16 is moved to a concrete wall 18 and applied as a finish coat 20 to that wall 18. The large aggregate 14 is preferably, but optionally, collected in an aggregate container 22 for removal from the jobsite or reuse, or dumped onto the ground for later disposal.

The screen assembly 12 is advantageously supported on a base 26. The base 24 has at least three and preferably four base legs 28 supporting the base 24 on the ground or other support surface. The base legs 28 are shown as tubes with a rectangular cross-section but any cross-sectional shape is believed suitable, including cylindrical legs with a circular cross-sectional shape. Optional feet 30 on the bottom end of the base legs 28 may be used to help avoid having the bottom ends of the base legs digging into the ground when the assembly 12 rests on the ground. The feet 30 are shown as rectangular plates, but other shapes could be used, including circular shaped feet.

The top end of the base 32 is preferably horizontal with the base legs 28 each having the same length. The base 32 advantageously has braces 32 extending between one or more base legs 28 to stiffen the base 32 and resist twisting in a horizontal plane and resist lateral movement.

The screen assembly 12 advantageously has a screen 36 with a guiding frame 38 on a top surface of the screen 36 and a support frame 40 on a bottom surface of the screen 36. The screen 36 is shown as a rectangular screen with opposing first and second screen sides, and opposing top and bottom screen ends, and opposing top and bottom screen surfaces. The support frame 40 has a plurality of screen assembly legs 42 extend downward at locations corresponding to the base legs 28. Advantageously, a different connector 44 is optionally interposed between a bottom of each screen assembly leg 42 and the top of the corresponding base leg 28. The connector 44 advantageously comprises a flexible connector such as a spring or similar dampening device. A coil spring and an elastomeric (e.g., rubber) damper are believed suitable, as are other parts that can allow the screen assembly 12 and base 24 to move relative to each other vertically while at least partially restraining lateral movement of the screen assembly. The connectors 44 allow the screen assembly 12 to move and vibrate relative to the base 24 and reduce vibration of the screen assembly relative to the base along the length of the base legs and support legs, and preferably reduce vibration in the lateral directions as well.

The screen 36 is preferably a mesh screen having a plurality of screen openings 46 46 of uniform size and preferably formed of woven wire having a diameter of ⅛ to ¼ inch. The screen openings 46 are preferably 0.2 to 0.5 inches square. The size of the screen openings 46 are selected based on the largest size of aggregate desired in the second concrete mixture 16. The screen openings 46 may be formed other ways, as for example a perforated sheet with screen openings 46 of the specified size or shape (e.g., circular openings 46).

The guide frame 38 may extend around a major portion of the periphery of the screen 36 and is located on the top surface of the screen so it can guide the flowable first concrete mixture 10 and the large aggregate 14 after it is separated from the first concrete mixture. The illustrated guide frame 38 has first and second side frame members 38*a*, 38*b* extending along opposing long sides of a rectangular shaped screen 36. Top and bottom end frame members 38*c*, 38*d* extend along respective top and bottom sides of the screen 36 with the top end frame member 38*c* advantageously joining the top ends of the side frame members 38*a*, 38*b*, and with the bottom end frame member 38*d* joining the bottom ends of the side frame members 38*a*, 38*b*. The bottom end frame member 38*d* has an opening 48 therein, preferably at its middle and located at the center of the bottom side of the screen 36. The guide frame members 38*a*, 38*b*, 38*c* and 38*d* are shown as a rectangular frame around the periphery of the rectangular screen 36. The configuration of the guide frame members can vary with the shape of the screen 36.

The guide frame 38 advantageously includes first and second funnel members 50*a*, 50*b* lower ends located at opposing ends of the opening 48, with the funnel members extending to the respective first and second guide frame side members 38*a*, 38*b*. The top ends of the funnel members 50*a*, 50*b* are further apart than the bottom ends of the funnel members at the opening 48, to form a V-shaped funnel that funnels or directs aggregate on the top of the screen 36 toward the opening 48. In the depicted embodiment the bottom ends of the funnel members 50*a*, 50*b* are parallel to each other and spaced apart a distance corresponding to a width of the aggregate container 22 into which the large aggregate 14 is placed. The space between these parallel bottom ends of the funnel members 50*a*, 50*b* form a spout of the funnel shaped members, and form the opening 48 through which the large aggregate 14 passes after being separated from the first concrete mixture 10.

Figure 2:
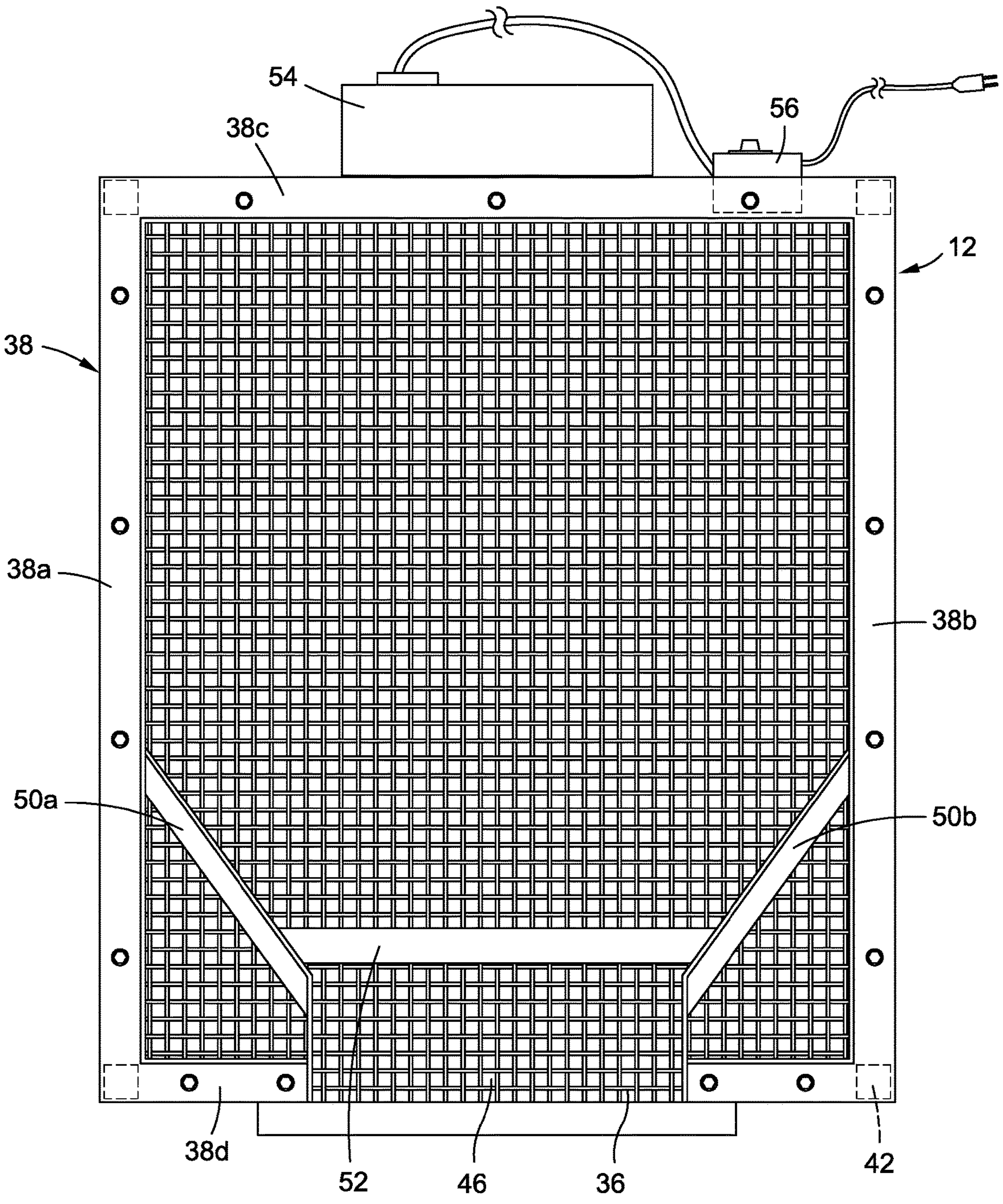
FIG. 2 is a top view of the vibrating screen assembly of FIG. 1.

As best seen in FIG. 1, a dispensing plate 51 may be connected to each inward end of the guide frame 38*d* and outward below the bottom end of the screen 46, upper guide frame 38 and lower support frame 40. As seen in FIG. 2, the dispensing plate 51 may be sandwiched between the bottom surface (or top surface) of the screen 46 and the lower support frame 40 or otherwise connected to the support frame 40. The dispensing plate 51 helps strengthen the screen assembly 12 across the gap in the bottom guide frame 38*d*, and helps prevent the large aggregate 14 from falling off the screen assembly until the aggregate is a distance below the screen so the aggregate container 22 does not have to contact the base legs 28 to ensure it catches or receives the large, separated aggregate 14.

A brace 52 (FIGS. 1-3) may extend between the funnel members 50*a*, 50*b*. The brace 52 is believed to strengthen the funnel members 50*a*, 50*b*, and to also strengthen the bottom end of the guide frame 38 which is weakened by the opening 48 in the bottom guide frame end 38*d*. The brace 52 advantageously extends between the funnel members 50*a*, 50*b* at a location toward the top portion of the funnel members 50*a*, 50*b* so that large aggregate 14 passes beneath the brace 52 and so the brace 52 may help reduce the bouncing of the large aggregate 14 near the bottom end of the funnel members 50*a*, 50*b*.

Advantageously, the guide frame 38 has a height extending above the top surface of the screen 36 a distance of about 1-4 inches, and preferably a distance of about 1-2 or about 1-3 inches. Shorter heights are believed usable but aggregate may bounce over the guide frame 38 during use, and wet concrete may flow over the guide frame 38 during use. Greater heights of the guide frames 38 are also believed usable and are advantageous in restraining and guiding thicker flows of wet concrete, but the weight increases and that has adverse effects on the energy required for the vibrating the screen assembly 12. Advantageously, the guide frame 38 is formed of angle iron having a horizontal leg on the top surface of the screen 36 that preferably extend inward toward a center axis of the screen, and having a vertical leg extending upward. While an L-shaped angle iron is preferred, guide channels having other cross-sectional shapes are believed suitable, including other open channel sections and also closed tubular sections such as square and round tubular sections.

The support frame 40 has a shape that preferably matches the peripheral shape of the guiding frame 38, but is slightly larger. The support frame 40 has first and second support frame side members 40*a*, 40*b*, respectively, on opposing sides of the screen 36 and extending along the respective sides of that screen, and located on the bottom surface of that screen. The support frame 40 has top and bottom support frame ends 40*c*, 40*d*, respectively, with the top support frame end 40*c* extending between the top end of the support frame side members 40*a*, 40*b* and the bottom support frame end 40*d* extending between the bottom end of the support frame side members 40*a*, 40*b*. The bottom support frame end 40*d* extends continuously and preferably has no opening or gap corresponding to opening 48.

Figure 3:
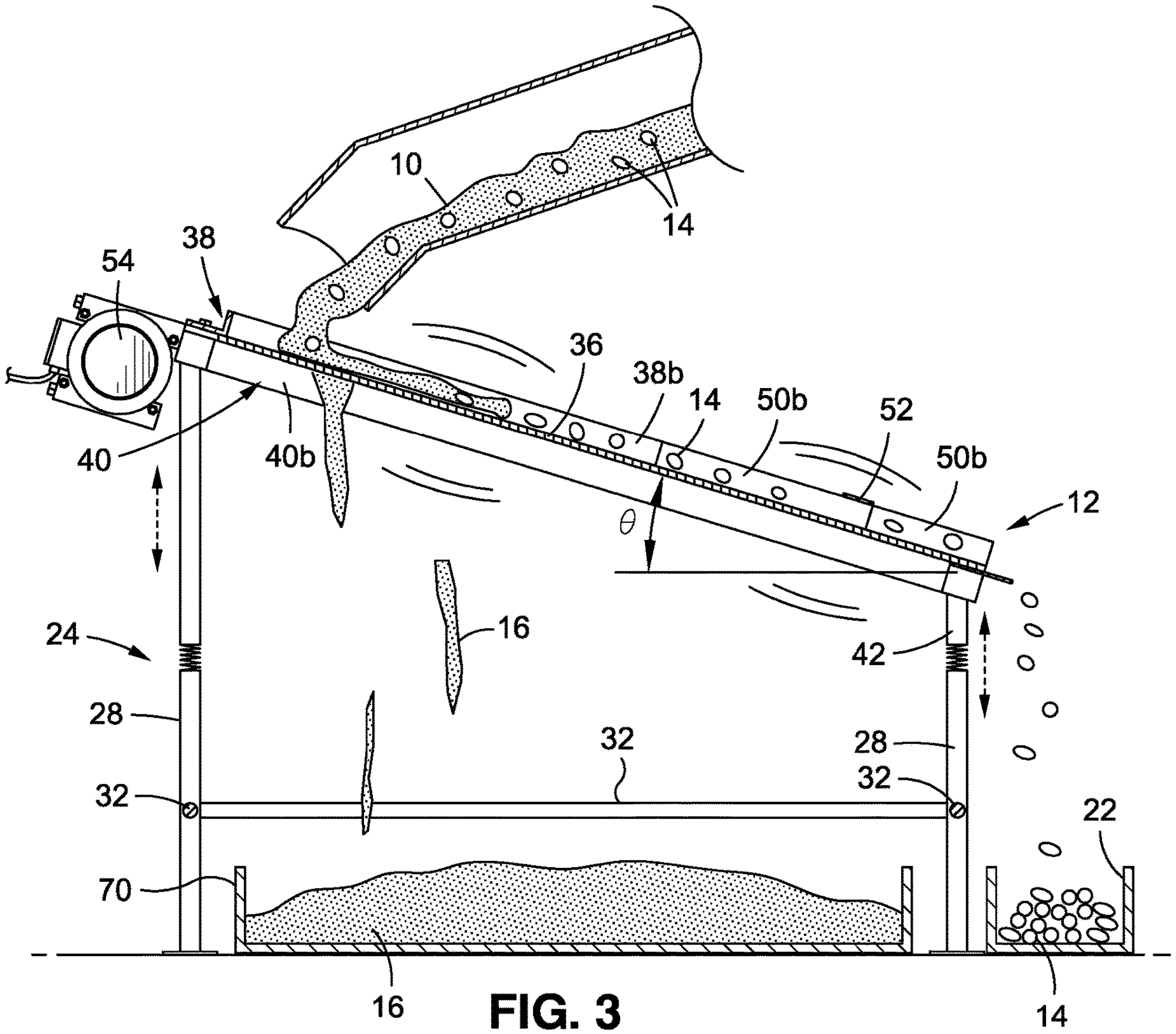
FIG. 3 is a sectional view taken along section 3-3 of FIG. 1 showing the vibrating screen in use to separate a first concrete mixture.
Figure 4:
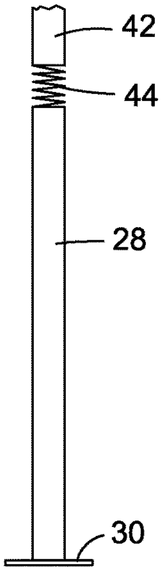
FIG. 4 is a partial view of a leg of the vibrating screen assembly of FIG. 1, showing a coil spring connector interposed between upper and lower leg parts.
Figure 5:
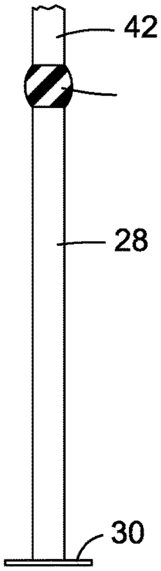
FIG. 5 is a partial view of a leg of the vibrating screen assembly of FIG. 1, showing an elastomeric connector interposed between upper and lower leg parts.
Figure 6:
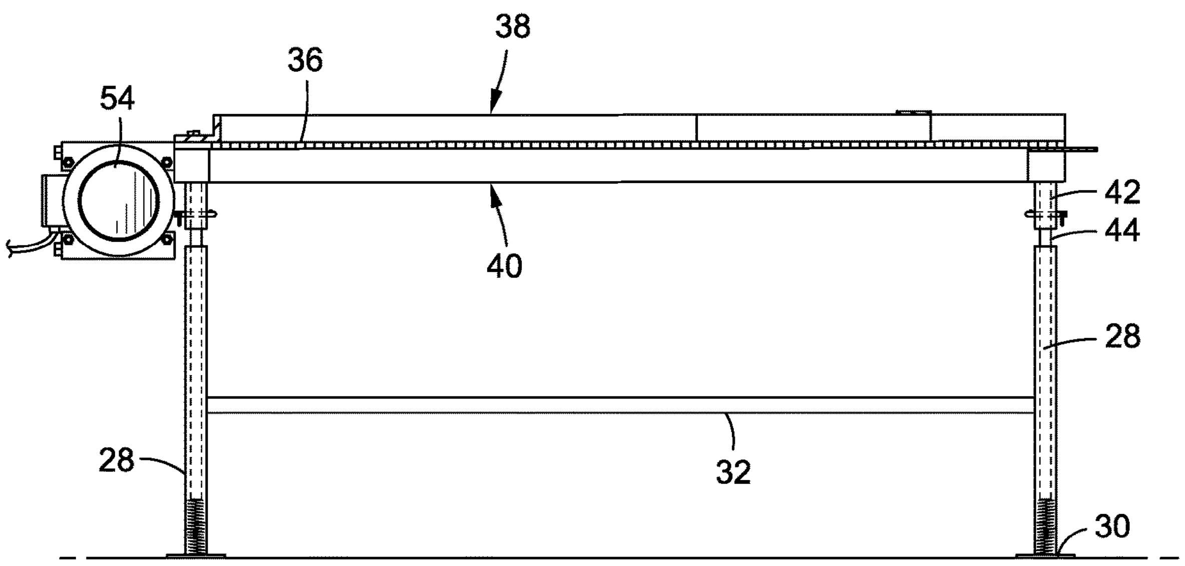
FIG. 6 is a sectional view taken along section 3-3 of FIG. 1.
Figure 7:
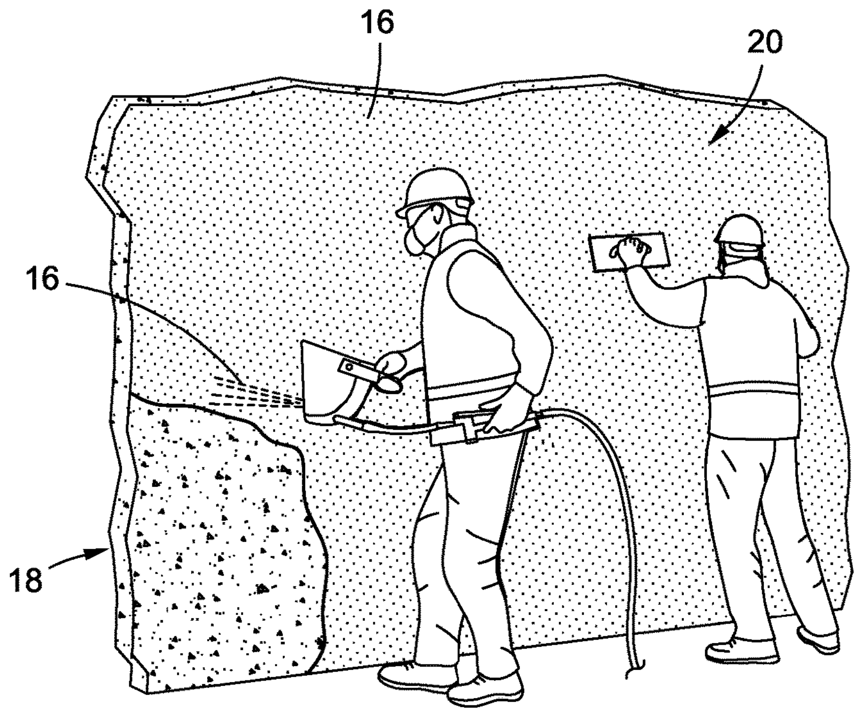
FIG. 7 is a perspective view of a wall being coated with a layer of a second cement mixture by a spray device and by a hand trowel.

The support frame 40 is advantageously made of angle iron, having one leg extending horizontally along the bottom side of the screen 36, and having a vertical leg extending downward. As seen in FIG. 1-3, the support frame 40 has an inner periphery of its horizontal leg overlap vertically with the vertical portion of the guide frame 38. As the illustrated screen 36 is rectangular in shape, the support frame 40 is shown as a rectangular frame slightly larger than the guide frame 38. The support frame 40 and guide frame 38 are preferably welded to the wire screen 36, but other mechanisms of connecting the support frame 40, guide frame 38 and screen 36 may be used, including threaded fasteners and clamps. It is believed suitable to bolt the guiding frame 38 to the support frame 40 with the screen 36 sandwiched between the two frames, but such bolted connections advantageously use various types of locking mechanisms to resist loosening of the bolted connections, including thread adhesives, plastic inserts on portions of the threads, or other unthreading mechanisms. The support frame 40 and guide frame 38 provide a stiff ring around the periphery of the screen 36 and around the periphery of the screen assembly 12.

A vibrator 54 is fastened to a top side of the screen assembly 12, preferably fastened to the guide frame top end 38*c* or the support frame top end 40*c*, or both. The vibrator 54 is engine powered, electrically powered, hydraulically powered, pneumatically powered, mechanically driven with a linkage or rotating cam, or otherwise moved so as to cause periodic vibrations to the screen assembly 12. As used herein, these various vibrational systems or mechanisms are referred to as a "powered vibrator" 54 and exclude human powered vibrators. Such powered vibrators 54 can operate continuously at over 500 vibrations per minute (full cycle), with vibrational rates of 1000 to 10,000 believed suitable.

An electrically power vibrator 54 provided by Vibco Inc. is believed suitable and it is believed to use a rotating, unbalanced rotor to shake the screen assembly 12. A vibrator control 56 may be mounted on the base 24 and placed in electrical communication with the vibrator 54 (e.g., by an electric cable) to provide power to the vibrator and to adjust the amplitude and optionally the frequency of the vibration produced by the vibrator 54.

The screen assembly 12 advantageously has at least two depending screen assembly legs 42 extending downward at locations corresponding to the location of base legs 28 and connectors 44 at the top end of the base 24 and screen assembly 12. The screen assembly legs 42 are advantageously located in the corners of the support frame 40 where the top support frame 40*c* connects to the first and second support frame sides 40*a*, 40*b*. The screen assembly legs 42 connect to the respective base legs 28 and connectors 44. The screen assembly legs 42 on the top end of the screen assembly 12 are longer than the legs 42 on the bottom of the screen assembly 12 so that the screen assembly 12 and screen 36 is inclined. The inclination can also be achieved by omitting the screen assembly legs 42 on the bottom end of the screen assembly and having the connectors 44 on the base legs 28 connect to sockets in the bottom support frame end 40*d*.

Figure 8:
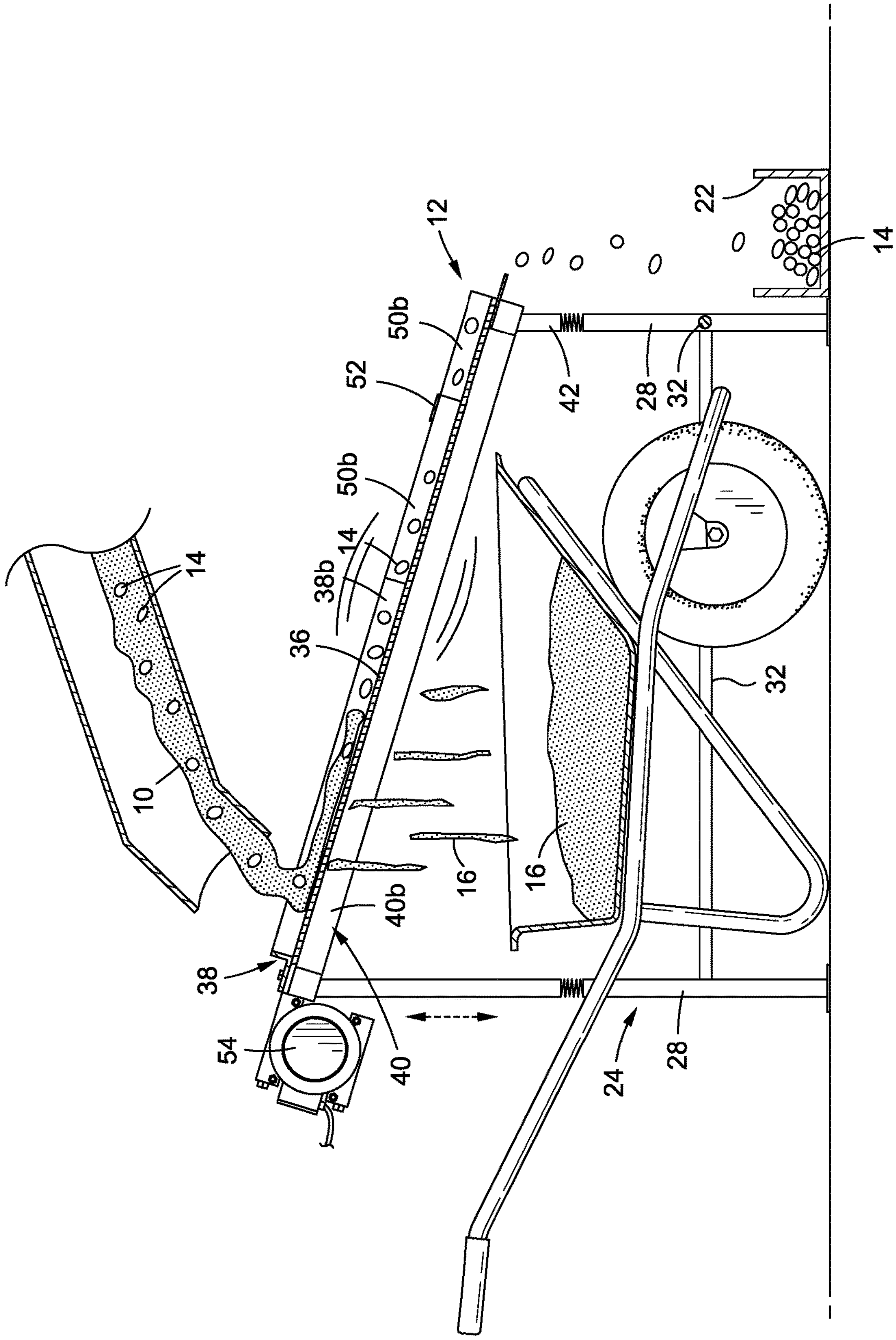
FIG. 8 is a sectional view taken along section 3-3 of FIG. 1, showing a wheel borrow below a screen and receiving a second concrete mixture from a vibrating screen.

Referring to FIGS. 3 and 8, the base legs 28 are long enough so that a concrete container 70 such as a wheel borrow or other wheeled container capable of holding at least one cubic foot of concrete can be placed beneath the screen 36 without being hit by the screen or screen assembly 12 during use.

In use, a first concrete screen 10 is provided having cement, water and a first aggregate grade typically having a predetermined maximum aggregate size. The first concrete mixture is advantageously used to form a concrete wall using concrete forms known in the art and/or as described in U.S. Pat. Nos. 9,102,572, 7,781,019 or 5,887,399, or using pneumatic sprayed concrete methods known in the art and/or as described in 8,962,088 or 8,962,087. The first concrete screen 10 is provided by mixing the cement, water and aggregate in a stationary container or in a rotating barrel in a small concrete mixing machine, or in a rotating barrel on a cement truck. A portion of that first concrete screen 10 is retained, or is provided for use as described below.

In use, the vibrator 54 is activated to vibrate the screen assembly 12 and its screen 36, with the vibrator control 56 adjusted to vary the amplitude of the vibration. The first concrete screen 10 is placed on the screen 36, preferably between the middle and top of the screen 36. The first concrete mixture 70 may be placed on or moved to the screen assembly 12 several ways, by shoveling manually or with a machine such as a skip-loader, by placing a discharge end of a trough on a concrete truck so the concrete is discharged onto the screen 36 (FIGS. 3, 8), by placing a discharge chute of a jointed concrete pumping line so the chute discharges onto the screen 36 (FIGS. 3, 8), or by other mechanisms.

The vibrating screen assembly 12 and vibrating screen 36 cause the non-hydrated first concrete mixture 10 to pass through the screen 36 except for those aggregate in the first concrete mixture that are larger than the screen openings 46 and referred to herein as large aggregate 14. The vibrating screen assembly 12 separates the large aggregate 14 from the first concrete screen 10 to create a second concrete mixture 76 having smaller aggregate with a maximum size determined by the size of the screen openings 46. The large aggregate 14 moves down the inclined screen 36, with the guide frame 38 guiding the larger aggregate and first concrete screen 10 toward the opening 48 at the bottom of the screen assembly and between the lower ends of the funnel members 50*a*, 50*b*. The inclination of the screen assembly 12 is selected so that the larger aggregate is separated from the first concrete mixture before the first concrete screen 10 reaches the opening 48. Alternatively phrased, all of the first concrete mixture passes through the screen 36 except for the large aggregate 14 to form the second concrete mixture 76, which falls by gravity into the concrete container 70 located beneath the screen 36. The vibrating screen 36 helps sift the large aggregate 14 from the first concrete mixture 10 and helps dislodge the second concrete mixture from the screen 36 into the concrete container 70. The screen 36 within the guide frame 38 and the concrete container 70 are sized and positioned with respect to one another to increase the volume or amount of the second concrete mixture 76 that falls into the concrete container 70 and to reduce the volume of the second concrete mixture 76 that misses the container 70.

Typically, a predetermined volume or amount of the first concrete mixture is placed onto the screen 36 with the predetermined volume selected to fill the concrete container to a predetermined level suitable for handling. The predetermined volume may be determined by controlling the volume of the first concrete screen 10 placed on the screen assembly 12, or by monitoring the volume of the second concrete mixture 76 in the concrete container visually. The size of the large aggregate 14 affects the volume of the second concrete mixture 76 in the concrete container 76 so placing a fixed amount of concrete on the screen assembly 12 or screen 36 may result in a different volume of the second concrete mixture in the concrete container 70.

The vibration of the screen 36 and screen assembly 12 is manually adjusted by the vibration control 56. The screen assembly 12 and screen 36 are inclined so the first concrete screen 10 slides downward toward opening 48 during vibration. Gravity and vibration urge the first concrete screen 10 downward through the screen openings 46, while the screen openings advantageously prevent passage of all but the large aggregate 74 which continues to move toward the opening 48 with the funnel members 50*a*, 50*b* guiding the larger aggregate 14 to the opening 48 as the larger aggregate is separated from the first concrete mixture. The vibrating screen assembly 12 thus separates the large aggregate 74 from the first concrete screen 10 to create the second concrete mixture 76 which passes through the screen 36 and falls downward, preferably into the concrete container 70 beneath the screen 36. The guiding frame 38 guides the first concrete screen 10 downward toward opening 48 and is advantageously high enough to keep the first concrete screen 10 from overflowing the guiding frame and falling onto the ground. As the first concrete mixture separates into the second concrete mixture the screen 36 contains less of the first concrete mixture and more of the large aggregate 14 and the guiding frame directs the large aggregate 14 out the opening 48 bounded by the funnel members 50*a*, 50*b*. The guiding frame 38 is advantageously high enough that bouncing aggregate does not bounce over the guiding frame.

Because the screen assembly 12 is inclined, even if the vibration from the vibrator 54 is along the midline plane through the center of gravity of the of the screen assembly 12 so the screen 12 oscillates in a pattern within a plane containing the screen, the inclination will cause vertical and horizontal (lateral) oscillating forces on the screen assembly 12 and the first concrete mixture and the larger aggregate contacting the screen 36 and screen assembly 12. Thus, some bouncing may occur. The larger aggregate 76 advantageously passes through the opening 48 in the bottom guide frame 48*d* and onto either the ground or into a container where the larger aggregate is collected for further disposition.

The second concrete mixture 46 has the larger aggregate 76 removed and comprises a concrete mixture with smaller aggregate. The size of the screen openings 46 may be varied depending on the nature of the second concrete mixture 76 that is desired. The second concrete mixture 76 is advantageously from the same mix or batch used to form the wall 18, but has the large aggregate 14 removed. If the second concrete mixture 76 is from the same concrete mixture as the wall 18 then the colors will more closely match while the use of smaller aggregate in the second concrete mixture 76 typically results in a stronger and more durable concrete when hardened.

The second concrete mixture 76 may have additional materials added, including retarder, water, and decorative aggregates as described in part in U.S. Pat. No. 8,962,087. The complete contents of each U.S. patent and U.S. application identified herein, is incorporated herein by reference.

The concrete container 70 and the second concrete mixture 76 may be moved to the wall 18 and applied to the outer surface of the wall to provide a finish coat. A concrete container 70 in the form of a wheel borrow containing the second concrete mixture provides a convenient manual way of moving the second concrete mixture. Other wheeled concrete containers 70 may be used, and non-wheeled containers such as buckets may also be used by placing funnels below the screen assembly to direct the flow of the second concrete mixture 76 into the concrete container 70. The second concrete mixture 76 may also be moved to the wall by a concrete pumping unit like that described for use with moving concrete to the screen with the second concrete mixture placed into smaller containers for use by workers, or placed into a holding container for further use, or distributed directly onto the wall 18 for further manipulation by workers.

Workers at the wall 18 may apply the second concrete mixture 76 by spraying the second concrete mixture under force (e.g., pump or pneumatic pressure) against the outer surface of the concrete wall (FIG. 7), or by troweling the second concrete mixture onto the outer surface of the wall 18. If a finish coating 20 with a smaller size of aggregate in the second concrete mixture 16 is desired, the screen 36 or the entire screen assembly 12 may be replaced, thus providing the ability to alter the finish coating at the jobsite.

The screen assembly 12 provides a stiff frame encircling the periphery of the screen 36 that resists bending perpendicular to the plane of the screen 36 by at least a factor of 10 and preferably by a factor of 20 to 30. The first concrete mixture 10 is non-hydrated and heavy, and if the screen 36 curves or dishes or otherwise deforms permanently downward then large aggregate 14 and the first cement mixture will collect in the downwardly deformed portion and further deform any depression. The guide frame 38 and support frame 40 help stiffen the screen 36 to resist deformation, especially during vibration by vibrator 54.

The connectors 44 are configured to isolate the movement and accompanying vibration forces exerted by the vibrating screen assembly 12 on the base frame 12. Allowing vertical and lateral motion as may occur when the connector 44 is a spring may allow the vibrator 54 to exert less force on the screen assembly. Reducing vertical and lateral motion as may occur when the connector 44 is a damper, such as a rubber or elastomeric member may reduce the forces transmitted to the base frame 12 but may require more force to be exerted on the screen assembly. The elastomeric connector 44 may be a solid tube of block of elastomeric material, or it may be an inflated bladder, such as a hollow ball or tube containing air, nitrogen or other gas.

The connectors 44 advantageously reduce the vibration forces that the screen assembly 12 exerts on the base frame 24 sufficiently that the base frame does not walk or move laterally on flat ground more than an inch for every five minutes of operation without any concrete mixture on the screen 36. The connectors 44 may be omitted. If the ground on which the base frame 24 rests is sufficiently flat, the system may work satisfactorily, especially for shorter periods of operation of a minute or so to separate the larger aggregate 74 from small batches of the first concrete mixture 10. But omitting the connectors 44 reduce the vibration forces of the screen assembly 12 and removing the connectors has the undesirable result of having the base frame 24 move or walk so the base frame 24 and the screen assembly 12 supported on the base frame can move relative to the concrete container 70 so that the second concrete mixture 16 does not fall into the concrete container. If the ground on which the base frame 24 rests is inclined the sideways movement of the base frame may be more pronounced. If the ground on which the base frame 24 is uneven so one or more of the base legs 28 are not adequately supported on the ground then the base frame and screen assembly 12 may be twisted and permanently bend.

The angle of inclination $\ominus$ of the screen 36 and screen assembly 12 is preferably between about 10° to 40° from the horizontal in a downward direction so the larger aggregate 74 moves toward the opening 48 at the bottom of the screen assembly. Larger angles of inclination $\ominus$ are believed suitable when the first concrete mixture 10 is thinner and less and smaller angles of inclination are believed suitable when the first concrete mixture 10 is thicker and more viscous. The angle of inclination $\ominus$ may be fixed, or adjustable. An adjustable angle of inclination may be provided by having two base legs 28 on one end of the base frame 24 vertically adjustable, as for example having telescoping legs nested inside one another and fixed in relative position by a pin (e.g., bolt) passing through holes in the inner and outer telescoping legs as in FIG. 6, or by having a pin (e.g., bolt) position the top or bottom end of the connector 44 inside the legs 28, 42. The telescoping connection is preferably on the bottom side of the connectors 44 so the pin does not experience the full vibration force exerted by the screen assembly 12 which vibrates during use. A similar telescoping leg arrangement may be provided on the legs 42 fastened directly to the screen assembly 12, but that is believed less desirable because the telescoping connection or other length adjustment mechanism is located above the connectors 44 and thus experience greater forces exerted by the vibrating screen assembly 12 which forces are not attenuated by the connectors 44.

The vibrating screen assembly 12 provides a fast and efficient way to separate the larger aggregate 74 from the first aggregate mixture 10. The use of a sturdy wire mesh screen 36 relying on gravity and vibration to sift the larger aggregate 74 from the first concrete mixture is believed to result in aggregate with a more uniform maximum size because large sized aggregate is not forced through less sturdy screens. In short, because the screen assembly 12 is heavy and stiff, the screen openings 46 do not allow slightly oversized larger aggregate 74 to be pushed through the screen openings. Similarly, because the screen is machine vibrated there is no need to manually push the first concrete mixture 10 downward through the screen and only gravity and the weight of any concrete mixture above the screen urging larger aggregate 74 against the screen 36 so slightly oversized larger aggregate is not forced through the screen openings 46.

The separation of the larger aggregate 74 from the first concrete mixture 10 without the use of manual force is thus believed to result in a second concrete mixture 16 that has a more consistent maximum size of aggregate. Similarly, using a sturdier and heavier metal frame, and a more sturdy screen 36 held in a stiffer frame screen assembly 12 (via frames 38, 40) than a hand held frame, is believed to result in screen openings 46 that do not vary in size compared to the prior art and that is believed to result in a second concrete mixture 16 that has a more consistent maximum size of aggregate.

The screen assembly 12 may weight over 100 pounds with a distance between the guide side frames 38*a* and 38*b* being 3-4 feet or more to accommodate the width of a wheel borrow and 4-5 foot for a larger wheeled, hand drawn wagon, and having a horizontal length between guide end frames 38*c*, 38*d* of 3 to 4 feet for the same wheel borrow described immediately above and 5-6 foot for the larger hand drawn wagon. Larger concrete containers 70 can accommodate larger screen assemblies 12.

The reduction in time to separate the larger aggregate 74 from the first concrete mixture 10 to produce the second concrete mixture 16 has many advantages, including more time to apply the second concrete mixture to the wall 18, more time to add additives such as color, decorative materials or other materials to the second concrete mixture that may enhance the performance or appearance of the finish coating applied to the wall 18. The volume of the second concrete mixture 16 that may be produced is significantly greater than the prior art and is more limited by the ability of moving the second concrete mixture from the screen assembly 12 than it is by the time needed to create the second concrete mixture. Because concrete cures and hydrates with time there are advantages in coating a concrete wall 18 with the finish coat 20 in as short a time as possible and for walls with large surface areas in excess of 1000 to 3,000 square feet, it may be difficult to obtain enough of the second, finish concrete mixture 16 as needed to apply the surface finish in a short period of time.

While it is preferable that the wall 18 be poured from the same batch of concrete that the second mixture is created taken from, that need not always be the case. The first concrete mixture may be a separate batch of concrete from that used to form the wall 18, or made at different times and in different than the concrete used to form the wall 18. While the color of the concrete may not match as close as arises when the second mixture is extracted from the same mixture used to make the wall 18, the other advantages of fast and efficient production of much larger volumes of the second concrete mixture 76 as described above still remain. Moreover, the screen 36 and/or the screen assembly may be changed so the screen openings 46 can be changed to alter the size of the large aggregate removed to create the second concrete mixture 76, providing flexibility in the aggregate content of that second concrete mixture. Thus, the present invention includes separating large aggregate 14 from a first concrete mixture to produce a second concrete mixture 16 in a fast, efficient, and large volume process. By changing the screen 36 for one with different sized screen openings 46, the second concrete mixture 16 may be changed. As the screen 36 may be clamped between the guide frame 38 and the support frame 40 by threaded fasteners such as nuts and bolts (bolt heads shown in FIGS. 1-3, 6 and 8), an apparatus is provided that allows changing the aggregate size in the second concrete mixture 16. Moreover, the entire screen assembly 12 may be changed by disconnecting the base 28 from the screen assembly at the connectors 44, further providing an apparatus that allows changing the aggregate size in the second concrete mixture 16.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. An apparatus for preparing a finishing mixture from a concrete mixture for use on a concrete surface, the concrete mixture having aggregate, the apparatus comprising:

a wire mesh screen having a plurality of uniformly-sized screen openings;

a guide frame connected to the wire mesh screen, the guide frame having opposing top and bottom frame ends connected by opposing first and second guide frame sides, each guide frame side and the top guide frame end having an inward extending leg on a top surface of the screen and connected to the screen adjacent a periphery of the screen and an upward extending leg extending above the screen adjacent the periphery of the screen, the bottom guide frame end having a central frame opening;

a first funnel member extending over the top surface of the screen and having a top funnel end at the first frame side and a bottom funnel end at a first side of the central frame opening;

a second funnel member extending over the top surface of the screen and having a top funnel end at the second frame side and a bottom funnel end at a second side of the central frame opening;

a powered vibrating unit connected to the frame to vibrate the frame;

at least one bottom support leg connected to one of the bottom end frame or a bottom portion of different ones of the first and second side frames; and at least one top support leg connected to one of the top end frame or a top portion of different ones of the first and second side frames, with said at least one top support leg being longer than the at least one bottom support leg to incline the screen and frame at an angle from the horizontal.

2. The apparatus of claim 1, further comprising one of a damper or spring in each of said at least one leg at a location closer to the screen than the distal end of the respective at least one leg and oriented to reduce vibration along a length of the respective at least one leg.

3. The apparatus of claim 1, further comprising a support frame on the opposing surface of the screen as the guide frame and connected to at least one of the screen or guide frame around the periphery of the screen and overlapping in a vertical direction a major portion of the guide frame.

4. The apparatus of claim 2, further comprising a support frame on the opposing side of the screen as the guide frame and connected to at least one of the screen or support frame around the periphery of the screen and overlapping in a vertical direction a major portion of the guide frame.

5. The apparatus of claim 2, wherein the first and second side frames have an L-shaped cross-section with one leg perpendicular to the screen and those perpendicular legs spaced 2 to 5 feet apart.

6. The apparatus of claim 2, wherein the screen openings are smaller than 0.2 inches.

7. The apparatus of claim 2, wherein the screen comprises a woven wire screen.

8. The apparatus of claim 2, wherein the angle of inclination is between 20° and 45°.

9. A method of forming a concrete mixture, comprising the steps of:

providing a first mixture of non-hydrated, flowable concrete comprising a cement, aggregate larger than 0.2 inches, and water;

placing the first mixture onto an inclined screen having uniformly sized screen openings, the screen having opposing first and second screen sides and opposing top and bottom screen ends extending between the screen sides, with the top screen end higher than the bottom screen end, the screen having opposing top and bottom screen surfaces;

guiding a portion of the first mixture and aggregate that does not pass through the screen openings along a length of the screen and toward a bottom frame opening at the bottom of the screen, the portion of the first mixture and aggregate that does not pass through the screen openings being guided by a guide member extending over the screen; and vibrating the inclined screen using a powered vibrator so non-hydrated concrete passes through the screen openings to form a second concrete mixture from which aggregate larger than the screen openings is removed.

10. The method of claim 9, wherein the second concrete mixture passes into a manually movable container.

11. The method of claim 10, wherein the container is located beneath the vibrating screen.

* * * * *